US012793037B2

(12) United States Patent
Favreau et al.

(10) Patent No.: US 12,793,037 B2
(45) Date of Patent: Nov. 10, 2026

(54) METHOD FOR PROVIDING A USER WITH CONTROL OVER A PAYMENT CARD

(71) Applicant: THALES DIS FRANCE SAS, Meudon (FR)

(72) Inventors: Valentin Favreau, Issy les Moulineaux (FR); Sylvain Chafer, Garches (FR); Richard Oung, Villiers sur Marne (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 19/110,513

(22) PCT Filed: Aug. 29, 2023

(86) PCT No.: PCT/EP2023/073729
§ 371 (c)(1),
(2) Date: Mar. 11, 2025

(87) PCT Pub. No.: WO2024/056376
PCT Pub. Date: Mar. 21, 2024

(65) Prior Publication Data

US 2026/0094145 A1 Apr. 2, 2026

(30) Foreign Application Priority Data

Sep. 12, 2022 (EP) .................................... 22306343

(51) Int. Cl.
*G06Q 20/32* (2012.01)
*G06Q 20/34* (2012.01)
*H04W 4/80* (2018.01)

(52) U.S. Cl.
CPC ............ *G06Q 20/327* (2013.01); *H04W 4/80* (2018.02); *G06Q 20/352* (2013.01)

(58) Field of Classification Search
CPC .... G06Q 20/327; G06Q 20/352; G06Q 20/32; G06Q 20/321; H04W 4/80
(Continued)

(56) References Cited

U.S. PATENT DOCUMENTS 9,881,305 B1 * 1/2018 Lewis ................ G06Q 20/4016
2023/0045879 A1 * 2/2023 Tunnell .............. G06Q 30/0269

FOREIGN PATENT DOCUMENTS

EP 2811445 A1 12/2014
WO WO-2017033118 A1 * 3/2017 ........... G06Q 20/352

OTHER PUBLICATIONS

International Search Report (PCT/ISA/210) and Written Opinion (PCT/ISA/237) mailed on Sep. 15, 2023, by the European Patent Office as the International Searching Authority for current International Application No. PCT/EP2023/073729—[12 pages].

* cited by examiner

*Primary Examiner* — Clifford B Madamba

(57) ABSTRACT

Provided is a method for providing a user with control over a payment instrument. A financial application hosted in a mobile apparatus generates an enciphered payload comprising an indicator reflecting an agreement of the user to perform a financial transaction involving the payment instrument. The financial application triggers the starting of BLE advertising by the mobile apparatus, advertising data broadcasted by the mobile apparatus comprising the enciphered payload. When engaged in the financial transaction, the payment instrument automatically checks a rule and starts scanning for BLE advertising data if the rule requires a control based on the proximate presence of the mobile apparatus. The payment instrument retrieves said indicator by deciphering the enciphered payload and contributes to the financial transaction according to the indicator. Other embodiments disclosed.

13 Claims, 3 Drawing Sheets

(58) Field of Classification Search
USPC ........................................................... 705/41
See application file for complete search history.

METHOD FOR PROVIDING A USER WITH CONTROL OVER A PAYMENT CARD

FIELD OF THE INVENTION

The present invention relates to methods for managing a payment instrument. It relates particularly to methods for operating a payment instrument to perform a financial transaction in conjunction with a financial terminal.

BACKGROUND OF THE INVENTION

Smart cards are portable small devices comprising a memory, a microprocessor and an operating system for computing treatments. They may comprise services applications like Payment, Access control or Telecom applications. Such smart cards may comprise a plurality of memories of different types, like non-volatile memory and volatile memory. They are considered as tamper-resistant (or "secure") because they are able to control the access to the data they contain and to authorize or not the use of data by other machines. A smartcard may also provide computation services based on cryptographic components. In general, smartcards have limited computing resources and limited memory resources and they are intended to connect a host machine which provides them with electric power either in contact mode or contactless mode.

Contact smart cards are designed to communicate according to at least one contact protocol like ISO/IEC7816 T=0 or T=1 communication protocols. Contactless smart cards are designed to communicate according to at least one contactless protocol like a protocol defined by ISO/IEC 14443 standard.

SUMMARY OF THE INVENTION

Contactless payment cards are convenient since they allow fast payments. However, the security may be reduced compare to contact cards when the payment system requests no user authentication. Such a case may happen for small amounts for instance. In the event that a contactless payment card is stolen, a person who is not authorized to use the contactless payment card can use it to perform a transaction without consent of the genuine user (if the financial system does not require explicit user authentication).

The invention aims at solving the above mentioned technical problem.

An object of the present invention is a computer-implemented method for providing a user with control over a payment instrument. The method comprises the steps of:

- generating, by a financial application hosted in a mobile apparatus, an enciphered payload comprising an indicator reflecting an agreement of the user to perform a financial transaction involving the payment instrument;
- triggering, by the financial application, the starting of BLE advertising by the mobile apparatus, advertising data broadcasted by the mobile apparatus comprising said enciphered payload;
- when engaged in the financial transaction, automatically checking a rule by the payment instrument and starting scanning for BLE advertising data if said rule requires a control based on the proximate presence of the mobile apparatus;
- retrieving, by the payment instrument, said indicator by deciphering the enciphered payload; and
- contributing to the financial transaction, by the payment instrument according to said indicator.

Advantageously, the financial application may provide a broadcast manager of the mobile apparatus with a duration and the broadcast manager may force the mobile apparatus to broadcast BLE advertising data for said duration.

Advantageously, the user may select the duration through the financial application.

Advantageously, the enciphered payload may comprise a counter that is updated by the financial application with each transaction and the payment instrument may contribute to the financial transaction if said counter is synchronized with an internal reference that is updated by the payment instrument with each transaction.

Advantageously, the enciphered payload may further comprise a financial parameter applicable to the payment instrument and selected by the user via the financial application, the payment instrument may retrieve said financial parameter by deciphering the enciphered payload and update a configuration stored in the payment instrument with said financial parameter, then the payment instrument may use the configuration to contribute to the financial transaction.

Advantageously, the configuration may specify the type of financial service (e.g. VISA, local scheme) that must be enabled in the payment instrument for processing the financial transaction, an amount for the financial transaction (e.g. cash withdrawing) or an authentication rule defining how the payment instrument authenticates the user.

Advantageously, the payment instrument may set the configuration with a default parameter when powered, the enciphered payload may comprise a value indicating whether the default parameter should be modified with the financial parameter and the payment instrument may update the default parameter if required by said value.

Advantageously, the payment instrument may be a smart card, a payment ring or an electronic watch.

Advantageously, a hardware terminal participating to the financial transaction may supply power to the payment instrument through a contact communication interface or through a contactless communication interface.

Advantageously, the financial transaction may be a payment transaction or a cash withdrawal.

Another object of the present invention is a payment instrument comprising a hardware processor and a memory storing a rule. When engaged in a financial transaction, the payment instrument is configured to automatically check the rule and to start scanning for BLE advertising data if said rule requires a control based on the proximate presence of a mobile apparatus. The payment instrument is configured to:

- get advertising data broadcasted by the mobile apparatus, said advertising data comprising an enciphered payload generated by a financial application hosted in the mobile apparatus,
- decrypt the enciphered payload to retrieve an indicator reflecting an agreement of a user to perform the financial transaction with the payment instrument; and
- contribute to the financial transaction according to said indicator.

Advantageously, the financial application may be configured to provide a broadcast manager of the mobile apparatus with a duration and the broadcast manager may be configured to force the mobile apparatus to broadcast BLE advertising data for said duration.

Advantageously, the enciphered payload may comprise a counter that is updated by the financial application with each transaction, the payment instrument may be configured to contribute to the financial transaction if said counter is synchronized with an internal reference stored in said memory and the payment instrument may be configured to update the internal reference with each transaction.

Advantageously, the enciphered payload may further comprise a financial parameter applicable to the payment instrument, the payment instrument may be configured to retrieve said financial parameter by deciphering the enciphered payload and to update a configuration stored in said memory with said financial parameter, then to use the configuration to contribute to the financial transaction.

Advantageously, the payment instrument may be configured to set the configuration with a default parameter when powered, the financial application may be configured to generate an enciphered payload comprising a value indicating whether the default parameter should be modified with the financial parameter and the payment instrument may be configured to update the default parameter if required by said value.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of payment instrument. The invention is well suited for contactless payment instruments and may also apply to payment instruments connected to a financial terminal in contact mode. The invention may apply to contactless payment cards, connected-watches, payment rings and contact payment cards for instance.

Figure 1:
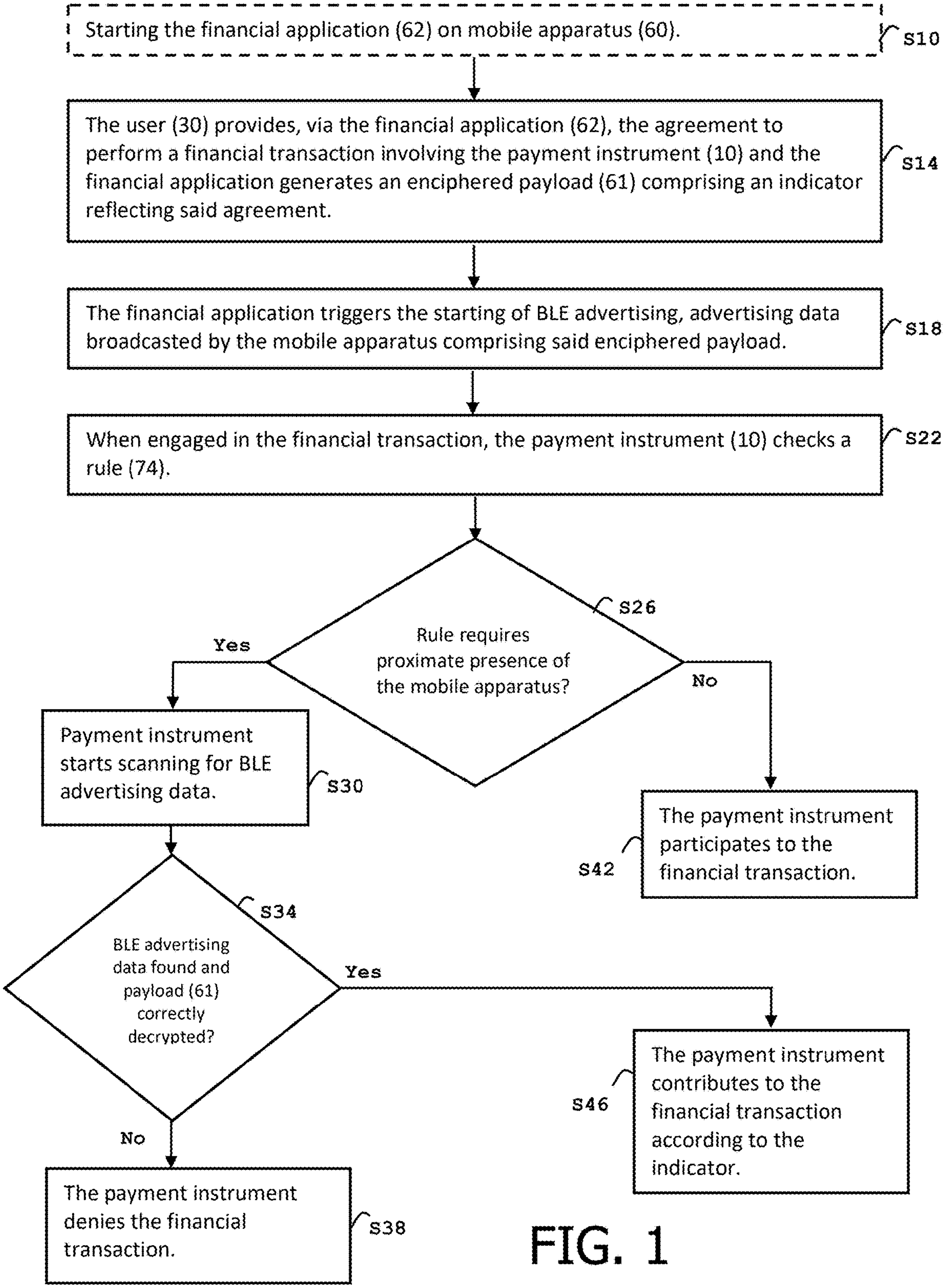
FIG. 1 shows a first exemplary flow diagram for providing the genuine user with control over a payment instrument according to an example of the invention.

FIG. 1 depicts a first exemplary flow diagram for providing the genuine user with control over a payment instrument according to an example of the invention.

In this example, the payment: instrument 10 is a contactless card associated with a user (i.e. bank customer) for payment or cash withdrawal.

Alternatively, the payment instrument may be a contact smart card, a payment ring or an electronic watch for instance.

The genuine user is assumed to wear the payment instrument 10 and a mobile apparatus 60 previously paired with the payment instrument so that the payment instrument is able to decrypt data enciphered by the mobile apparatus. The mobile apparatus may be a phone, a personal digital assistant (PDA) or a connected-watch for instance.

In a preliminary step S10, a financial application 62 installed on the mobile apparatus 60 is started.

At step S14, the financial application 62 gets the agreement of the user to perform a financial transaction involving the payment instrument 10. In other words, the financial application 62 gets the agreement of the user to authorize the payment instrument 10 to contribute to a financial transaction. Then the financial application 62 generates an enciphered payload 61 that comprises an indicator reflecting the user's agreement.

At step S18, the financial application 62 triggers the starting of Bluetooth Low Energy© (BLE) advertising by the mobile apparatus 60. Advertising data broadcasted by the mobile apparatus comprise the generated enciphered payload 61.

At step S22, when engaged in a financial transaction, the payment instrument 10 checks a rule 74 stored in a memory of the payment instrument. The rule 74 specifies a risk management policy that has been previously recorded in the payment instrument during a personalization phase.

At step S26, the payment instrument knows if the rule 74 requires the presence of the mobile apparatus proximate the payment instrument.

If the rule 74 requires the presence of the mobile apparatus near the payment instrument, the payment instrument starts scanning for BLE advertising data at step S30 else it participates to the financial transaction at step S42.

In the event that the rule 74 requires the presence of the mobile apparatus near the payment instrument, the payment instrument checks if BLE advertising data have been found then decrypts the payload 61 conveyed in the BLE advertising data to retrieve the indicator reflecting the user's agreement at step S34.

If the payment instrument did not detect any BLE advertising data or did not manage to correctly decrypt the payload or retrieve an indicator that does not reflect the user's agreement, the payment instrument denies the financial transaction at step S38.

At step S46, if the payment instrument successfully retrieved the indicator reflecting the user's agreement, it contributes to the financial transaction according to the indicator. The indicator may specify the agreement of the user to perform the financial transaction in which the payment instrument is engaged.

In some embodiments, the indicator may specify the agreement of the user to perform a cash withdrawal for a limited or unlimited amount.

In some embodiments, the indicator may specify the agreement of the user to perform a payment for a limited or unlimited amount.

In some embodiments, the indicator may specify the agreement of the user to perform all financial transactions within a limited time (like one hour or until the end of the day) or to perform a number of financial transactions. In such cases, the payment instrument may be configured to automatically consider that operations of steps S22 to S34 are successful for further financial transactions, without searching for BLE advertising signal.

In some embodiments, when the rule 74 does not require the presence of the mobile apparatus near the payment instrument, the payment instrument may act as a conventional payment instrument at step S42. For instance, the payment instrument can contribute to the successful completion of the financial transaction or refuse the transaction to be completed depending on the context (e.g. amount, type of terminal) or data collected (PIN code or biometric fingerprint for instance) from the user.

In some embodiments, the mobile apparatus 60 comprises a broadcast manager 64 and the financial application 62 provides the broadcast manager 64 with a selected duration. The broadcast manager forces the mobile apparatus 60 to broadcast BLE advertising data for the selected duration. The duration may be automatically selected by the financial application 62 or specified by the user through a user interface of the financial application 62. The selected duration may be from 10 seconds up to 5 minutes for instance. Other value may be used according to time of the booting phase of hardware components of the payment instrument or convenience for the user.

In some embodiments, the enciphered payload 61 may further comprise a counter 65 that is updated by the financial application 62 with each transaction. The payment instrument may be configured to contribute to the financial transaction only if the received counter 65 is synchronized with an internal reference 76 which is updated by the payment instrument with each transaction. Such a synchronization mechanism allows to defeat replay attack attempts.

Assuming that the payment instrument 10 is a contactless payment card having a rule 74 requiring the proximate presence of the mobile apparatus and the user wants to do a payment transaction for an amount of 40 Euros.

The BLE-enabled smartphone of the user may be used to provide control over the payment card. Before doing the actual payment (I.e.: a tap on the POS terminal), the user launches the financial application on the smartphone and confirm their agreement to do the payment with their payment card.

Then the smartphone advertises in BLE and may display information on the screen so the user know he/she can continue with the payment on the POS terminal. Then the user taps the payment card on POS terminal and the payment card automatically scan for searching BLE advertising data. If the card finds BLE advertising data broadcasted by the smartphone, the payment card processed the treatment to contribute to the payment transaction. If the card does no find BLE advertising data, then the payment card rejects the payment transaction.

Figure 2:
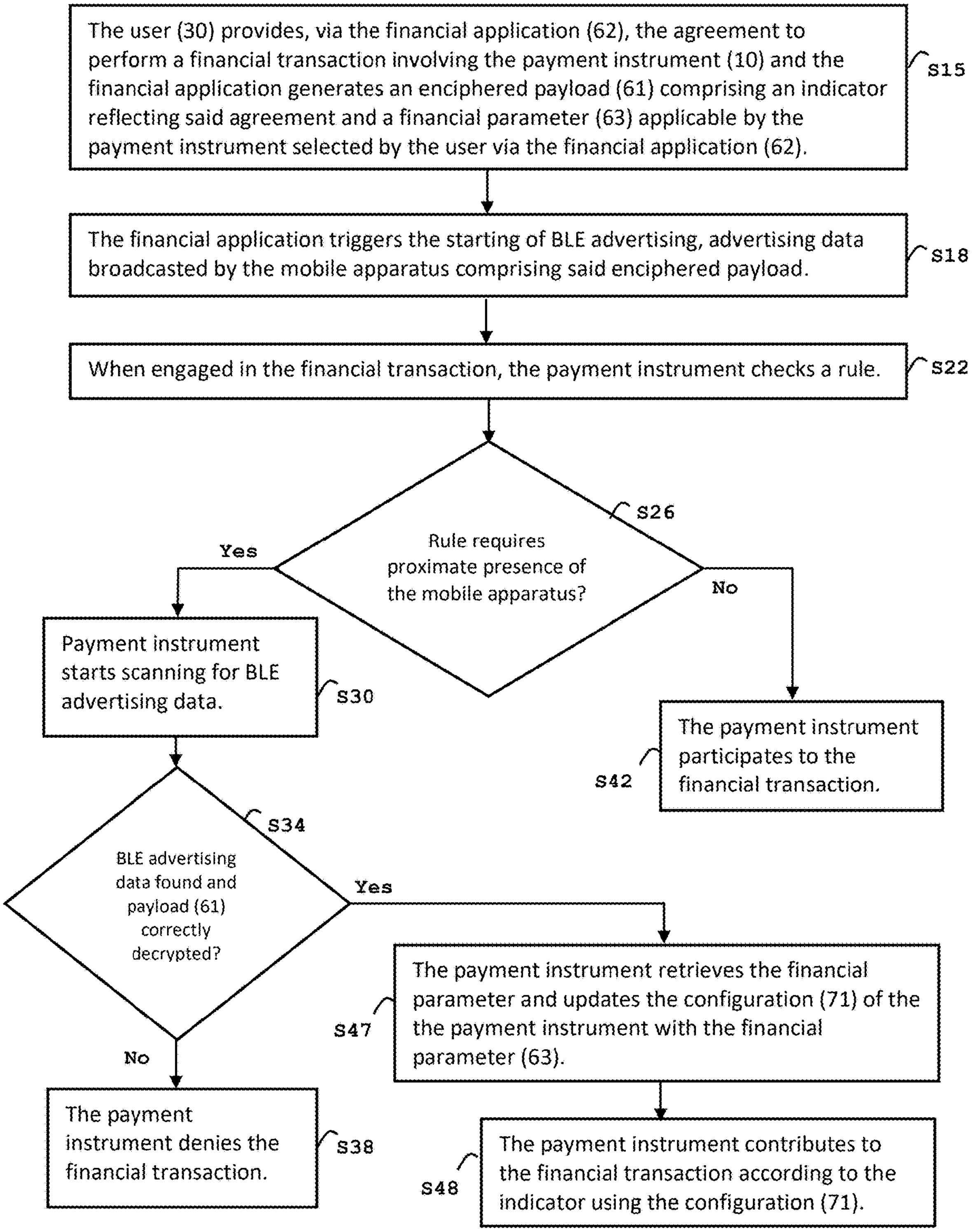
FIG. 2 shows a second exemplary flow diagram for providing the genuine user with control over a payment instrument according to an example of the invention.

FIG. 2 depicts a second exemplary flow diagram for providing the genuine user with control over a payment instrument according to an example of the invention.

In this example, the payment instrument 10 is a contactless card assigned to a user.

The payment instrument comprises a configuration 71 stored in a non-volatile memory of the payment instrument. The configuration 71 is a set of parameter(s) specifying how the payment instrument must behave for contributing to a financial transaction. For example, the configuration 71 may specify the type 44 financial service (e.g. VISA™ or local payment scheme) that should be enabled by the payment instrument 10 for processing the financial transaction. The configuration 71 may specify an authentication rule (e.g. PIN code authentication, biometric authentication or threshold without user authentication) defining how the payment instrument authenticates the cardholder.

At a preliminary step S10 (not shown at FIG. 2), a financial application 62 starts on the mobile apparatus 60.

Then at step S15, the financial application 62 gets both the agreement of the user to perform a financial transaction involving the payment instrument 10 and a financial parameter 63 applicable to the payment instrument for contributing to the financial transaction. Thus, the financial application 62 gets both the agreement of the user to authorize the payment instrument 10 to contribute to a financial transaction and a financial parameter 63 selected by the user via the financial application. Then the financial application 62 generates an enciphered payload 61 that comprises both the financial parameter 63 and an indicator reflecting the user's agreement.

The method continues with steps S18 to S42 similar to those described at FIG. 1.

If the payment instrument has captured BLE advertising data and successfully decrypted the payload 61, the payment instrument may successfully retrieve both the financial parameter 63 and the indicator reflecting the user's agreement. The payment instrument may update its configuration 71 with the financial parameter 63 at step S47.

Then at step S48, the payment instrument uses the updated configuration 71 to contribute to the financial transaction according to the indicator.

The configuration 71 may specify the type of financial service to be used by the payment instrument for contributing to the financial transaction, an amount for the financial transaction (e.g. for cash withdrawing) or an authentication rule defining how the payment instrument authenticates the user.

In some embodiments, the payment instrument sets the configuration 71 with a default parameter 72 when it is powered (e.g. as part of the boot phase for example). The enciphered payload 61 may comprise a value indicating whether the default parameter should be modified with the financial parameter and the payment instrument may update the default parameter 72 if required by this value. In such a case, the payment instrument updates with the received financial parameter 63 both the default parameter 72 and the configuration 71.

In some embodiments, two or more financial parameters may be selected and included in the enciphered payload 61 so that the payment instrument may apply more than one financial parameter for contributing to the financial transaction.

In some embodiments, the rule 74 may not require the presence of the mobile apparatus proximate the payment instrument (step S26). In such a case, the payment instrument may still start scanning for BLE advertising data (like at step S30), retrieve a financial parameter 63 from the detected BLE advertising data and update the configuration 71 before participating to the financial transaction (step S42). In such a case, the financial application 62 has generated an enciphered payload 61 comprising the financial parameter 63 selected by the cardholder. The financial parameter 63 may specify which payment application is to be enabled into the payment instrument before contributing to the financial transaction. The financial parameter 63 may specify whether the payment transaction should be conducted according to a debit or a credit. The financial parameter 63 may specify an amount for a cash withdrawal transaction.

In some embodiments, if the payment instrument does not detect any BLE advertising data after a preset time or does not manage to retrieve a financial parameter from a detected BLE advertising data, then the payment instrument participates to the financial transaction with a configuration 71 set to default value(s).

Figure 3:
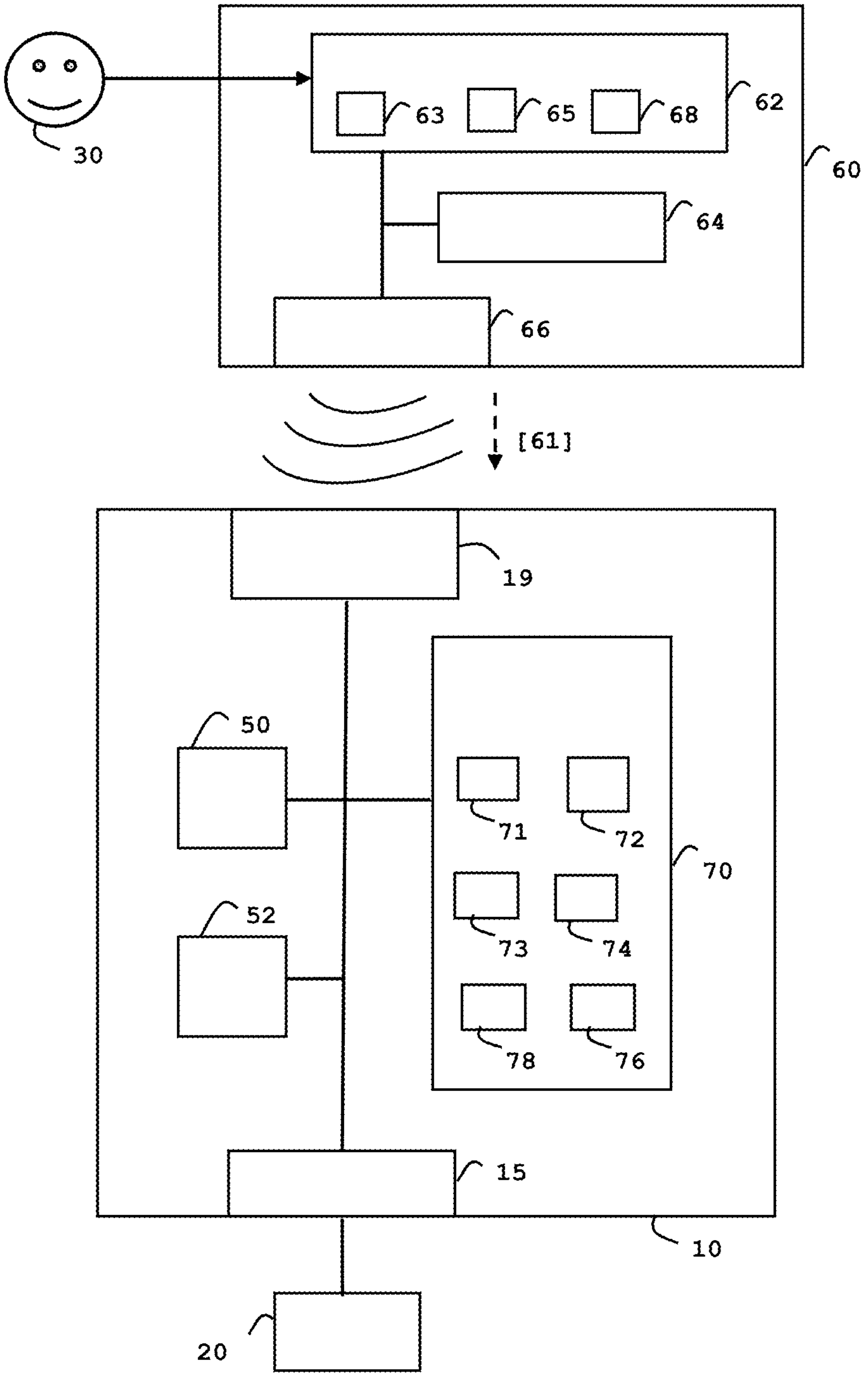
FIG. 3 shows a diagram of architecture of system comprising a payment instrument according to an example of the invention.

FIG. 3 depicts a diagram of architecture of system comprising a payment instrument 10 according to an example of the invention.

In this example, the payment instrument 10 is a payment smart card assigned to a user.

The payment instrument 10 comprises a secure chip (also called secure element) and a communication interface 19 which is designed to exchange data with outside in wireless mode. Preferably, the communication interface 19 is compliant with Bluetooth Low Energy© (BLE). The communication interface 19 is linked to the Secure element through a wired link.

The payment instrument 10 comprises a physical communication interface 15 able to communicate and operate according to ISO/IEC 7816 standard. In some embodiments, the physical communication interface 15 may be configured to communicate and operate according to a contactless protocol complying with ISO/IEC 14443 standard for example.

The secure chip comprises a hardware processor 50, a working memory 52 (which may be a RAM) and a non-volatile memory 70. The non-volatile memory stores an operating system 73 that includes software instructions that are executed by the processor 50 to perform the features of the secure chip. The secure element may be based on a conventional smart card chip with additional features. The secure element may be able to contribute to a banking transaction with an external machine. For instance, the transaction may be a payment transaction or cash withdrawal.

As shown at FIG. 3, the payment instrument 10 may be communicably coupled to a portable device 60 that may be a smartphone or a laptop for instance.

The portable device 60 comprises a financial application 62, a BLE interface 66 compliant with Bluetooth Low Energy (BLE) and a broadcast manager 64 in charge of managing BLE advertising operations of the BLE interface 66.

The financial application 62 is configured to get an agreement of a user 30 to perform a financial transaction with the payment instrument 10 and to generate an enciphered payload 61 comprising an indicator reflecting the agreement of the user. The financial application 62 may rely on conventional encrypting algorithms to encrypt the payload. The financial application 62 comprises a key 68 and is configured to use the key 68 for encrypting the payload.

The key 68 is assumed to have been identified during a previous phase of pairing of the portable device 60 with the payment instrument 10 so that a key 78—corresponding to the key 68—is stored in the non-volatile memory 70 of the payment instrument. These keys 68, 78 may have been generated as symmetric keys or as a pair of public/private keys.

The portable device 60 is configured to broadcast—according to the BLE advertising mode—advertising data that comprise the enciphered payload 61. The financial application 62 is configured to send a duration (time or date) to the broadcast manager 64 and the broadcast manager is adapted to force the BLE interface 66 to broadcast BLE advertising data for the received duration.

In some embodiments, the duration is predefined in the financial application 62.

In some embodiments, the financial application 62 may allow the user 30 to choose the duration of the BLE advertising. Thus, the user may select a duration through a user interface of the financial application 62 that sends the selected duration to the broadcast manager 64.

The predefined/selected duration can range from a few seconds to several hours. In some cases, the duration may be defined by specifying a stop time, for example 8:00 p.m. or midnight.

Thanks to some embodiments, the user may choose an appropriate duration of the BLE advertising signal emitted by the portable device 60. In particular, the user can adjust the duration according to their own assessment of the balance between convenience and exposure to risks in the event of loss of the payment instrument.

In the example of FIG. 3, the payment instrument 10 is communicably coupled to a conventional Point-Of-Sale (POS) terminal 20 through the physical communication interface 15. The POS terminal 20 is a hardware terminal that is intended to participate to financial transactions. It supplies power to the payment instrument through a contactless communication interface.

The secure element comprises program instructions intended to be executed by the processor 50 of the secure element to perform treatments required by the invention.

The non-volatile memory 70 stores a rule 74 that specifies a risk management policy. The rule 74 may have been previously recorded in the payment instrument during an initial personalization phase.

When engaged in a financial transaction, the payment instrument may be configured to automatically check the rule 74 and to start scanning for BLE advertising data if said rule requires a control based on the proximate presence of the mobile apparatus 60.

The payment instrument may be configured to search for BLE advertising data during a preset duration which may be set in the range from 10 seconds to 70 seconds for instance.

The payment instrument may be configured to get advertising data broadcasted by the mobile apparatus and to decrypt the enciphered payload 61 to retrieve the indicator reflecting an agreement of the user 30 to perform a financial transaction with the payment instrument.

The payment instrument may be configured contribute to the financial transaction (with the terminal 20) according to the retrieved indicator.

It is to be noted the payment instrument does not need to establish a Bluetooth Low Energy© (BLE) point-to-point communication channel with the mobile apparatus 60. Such a BLE channel establishment requires a handshake phase whose duration is longer than detecting advertising data broadcasted via the BLE advertising mechanism. Thus, the payment instrument only scans for BLE advertising data. Such a search may be done in a short time with low power consumption. This mechanism is well suited to the usual constraints of payment instruments that may have limited energy and limited time slots to try to detect the broadcasted advertising data. Such a search may be performed during a financial transaction engaged between the payment instrument and the terminal 20.

In some embodiments, the financial application 62 may be configured to include a counter 65 into the generated enciphered payload 61 and to update the counter 65 with each transaction. The payment instrument 10 may be configured to contribute to the financial transaction only if the received counter 65 (retrieved after deciphering the received payload 61) is synchronized with an internal reference 76 that is stored in the memory 70 of the payment instrument. The payment instrument may be configured to update its internal reference 76 with each transaction. The synchronicity check may consist of a comparison of the values of the received counter 65 and the internal reference 76 to check that these values are equal or close to each other. Such a synchronization mechanism allows preventing replay attack attempts.

In some embodiments, the financial application 62 may be configured to allow the user 30 to select a financial parameter 63 applicable to the payment instrument and to include the financial parameter 63 in the generated enciphered payload 61. The payment instrument may be configured to retrieve the financial parameter 63 by deciphering the enciphered payload 61 and to update a configuration 71 stored in the memory 70 of the payment instrument with the received financial parameter 63. In such a case, the payment instrument can be configured to use the updated configuration 71 to contribute to the financial transaction with the terminal 20.

The configuration 71 may specify the type of financial service/scheme that must be enabled in (and by) the payment instrument 10 for processing the financial transaction, an amount for the financial transaction (like the amount of a cash withdrawing transaction) or an authentication rule defining how the payment instrument authenticates the user before authorizing the financial transaction. Reciprocally, the financial parameter 63 may specify the type of financial service/scheme to use, an amount or an authentication rule.

In some embodiments, the financial application 62 may allow the user 30 to select two or more financial parameters and include the selected financial parameters in the payload 61. The payment instrument may be configured to take into account all received financial parameters.

In some embodiments, the payment instrument may set its configuration 71 with a default parameter 72 when powered. The financial application 62 may further include in the enciphered payload 61 a value indicating whether the default parameter should be modified with the financial parameter and the payment instrument may be configured to update its default parameter 72 (stored in the NVM memory 70) if required by the received value. Such mechanism allows to permanently update the default parameter 72 which can be used for subsequent financial transactions.

In some embodiments, the configuration 71 may comprise the rule 74.

Thanks to some embodiments of the invention, it is possible to dynamically configure the configuration 71 used by the payment instrument to contribute to a financial transaction. Such embodiments allow to quickly and smoothly adapt the behavior of the payment instrument according to preference previously defined in the financial application 62 or selected on-the-fly by the cardholder (i.e. the user). It is to be noted that the dynamic update of the configuration 71 into the payment instrument can be done without needing the deployment of new hardware devices (or software updates) at Point-Of-Sale side. In addition, the payment instrument knows which configuration was used for the transaction and can log it for further analysis or security reasons.

The invention is not limited to the described embodiments or examples. In particular, the described features of the presented embodiments may be combined as can be understood by those skilled in the art.

What is claimed is:

1. A computer-implemented method for providing a user with control over a payment instrument, said method comprising:

generating (S14), by a financial application hosted in a mobile apparatus, an enciphered payload comprising an indicator reflecting an agreement of the user to perform a financial transaction involving the payment instrument, wherein the financial application encrypts the payload using a first key established during a prior pairing phase between the mobile apparatus and the payment instrument;

triggering (S18), by the financial application, the starting of BLE Bluetooth Low Energy (BLE) advertising by the mobile apparatus, wherein the financial application provides a broadcast manager of the mobile apparatus with a duration ranging from a few seconds to several hours, and wherein the broadcast manager forces the mobile apparatus to broadcast BLE advertising data for said duration;

when engaged in the financial transaction, automatically checking (S22) a rule by the payment instrument; wherein advertising data broadcasted by the mobile apparatus comprises said enciphered payload; and wherein said method comprises:

starting (S30), by the payment instrument, scanning for BLE advertising data if said rule requires a control based on the proximate presence of the mobile apparatus, wherein the payment instrument scans for said BLE advertising data without establishing a Bluetooth Low Energy point-to-point communication channel with the mobile apparatus;

retrieving, by the payment instrument, said indicator by deciphering the enciphered payload conveyed in said advertising data, wherein the payment instrument deciphers the enciphered payload using a second key stored in a non-volatile memory of the payment instrument, said second key corresponding to the first key and established during said prior pairing phase; and contributing (S46) to the financial transaction, by the payment instrument according to said indicator.

2. The method according to claim 1, wherein the user selects said duration through the financial application.

3. The method according to claim 1, wherein the enciphered payload comprises a counter updated by the financial application with each transaction and wherein the payment instrument contributes to the financial transaction if said counter is synchronized with an internal reference updated by the payment instrument with each transaction.

4. The method according to claim 1, wherein the enciphered payload further comprises a financial parameter applicable to the payment instrument and selected by the user via the financial application wherein the payment instrument retrieves said financial parameter by deciphering the enciphered payload and updates (S47) a configuration stored in the payment instrument with said financial parameter, then the payment instrument uses the configuration to contribute to the financial transaction.

5. The method according to claim 4, wherein the configuration specifies the type of financial service that must be enabled in the payment instrument for processing the financial transaction, an amount for the financial transaction or an authentication rule defining how the payment instrument authenticates the user.

6. The method according to claim 4, wherein the payment instrument sets the configuration with a default parameter when powered, wherein the enciphered payload comprises a value indicating whether the default parameter should be modified with the financial parameter and wherein the payment instrument updates the default parameter if required by said value.

7. The method according to claim 1, wherein the payment instrument is a smart card, a payment ring or an electronic watch.

8. The method according to claim 1, wherein a hardware terminal participating to the financial transaction supplies power to the payment instrument through a contact communication interface or through a contactless communication interface.

9. The method according to claim 1, wherein the financial transaction is payment transaction or a cash withdrawal.

10. A payment instrument comprising a hardware processor and a memory storing a rule, when engaged in a financial transaction, the payment instrument being configured to automatically check the rule;

wherein the payment instrument is configured to:

start scanning for Bluetooth Low Energy (BLE) advertising data if said rule requires a control based on the proximate presence of a mobile apparatus, wherein the payment instrument scans for said BLE advertising data without establishing a Bluetooth Low Energy point-to-point communication channel with the mobile apparatus;

get advertising data broadcasted by the mobile apparatus, said advertising data comprising an enciphered payload generated by a financial application hosted in the mobile apparatus; wherein the financial application is configured to provide a broadcast manager of the mobile apparatus with a duration ranging from a few seconds to several hours and wherein the broadcast manager is configured to force the mobile apparatus to broadcast BLE advertising data for said duration;

decrypt the enciphered payload conveyed in said advertising data to retrieve an indicator reflecting an agreement of a user to perform the financial transaction with the payment instrument, wherein the payment instrument deciphers the enciphered payload using a key stored in a non-volatile memory of the payment instrument, said key corresponding to a key used by the financial application to encrypt the payload and established during a prior pairing phase between the mobile apparatus and the payment instrument; and contribute to the financial transaction according to said indicator.

11. The payment instrument according to claim 10, wherein the enciphered payload comprises a counter updated by the financial application with each transaction, wherein the payment instrument is configured to contribute to the financial transaction if said counter is synchronized with an internal reference stored in said memory and wherein the payment instrument is configured to update the internal reference with each transaction.

12. The payment instrument according to claim 10, wherein the enciphered payload further comprises a financial parameter applicable to the payment instrument, and wherein the payment instrument is configured to retrieve said financial parameter by deciphering the enciphered payload and to update a configuration stored in said memory with said financial parameter, then to use the configuration to contribute to the financial transaction.

13. The payment instrument according to claim 12, wherein the payment instrument is configured to set the configuration with a default parameter when powered, wherein the financial application is configured to generate an enciphered payload comprising a value indicating whether the default parameter should be modified with the financial parameter and wherein the payment instrument is configured to update the default parameter if required by said value.

* * * * *